United States Patent [19]

Ota et al.

[11] Patent Number: 4,795,950
[45] Date of Patent: Jan. 3, 1989

[54] PHASE CONTROLLER FOR MOTOR

[75] Inventors: Kiyoshi Ota, Neyagawa; Kazuo Arai, Hirakata, both of Japan

[73] Assignee: Matsushita Electric Industrial Co., Ltd., Osaka, Japan

[21] Appl. No.: 64,121

[22] Filed: Jun. 19, 1987

[30] Foreign Application Priority Data

Jun. 30, 1986 [JP] Japan .............................. 61-153157
Jul. 18, 1986 [JP] Japan .............................. 61-170053

[51] Int. Cl.$^4$ .................................................. H02P 5/16
[52] U.S. Cl. ..................................... 318/314; 318/301; 360/10.2; 360/10.3
[58] Field of Search ............... 318/314, 318, 301, 608, 318/312; 360/70, 73, 10.03, 10.02

[56] References Cited

U.S. PATENT DOCUMENTS

| | | | |
|---|---|---|---|
| 4,243,921 | 1/1981 | Tamura et al. | 318/314 |
| 4,254,367 | 3/1981 | Sakamoto | 318/314 |
| 4,271,382 | 6/1981 | Maeda et al. | 318/314 |
| 4,295,080 | 10/1981 | Fujita et al. | 318/336 |
| 4,463,390 | 7/1984 | Koga et al. | 360/73 |
| 4,484,235 | 11/1984 | Yokobori et al. | 318/314 |
| 4,564,794 | 1/1986 | Kilen et al. | 318/314 |
| 4,567,409 | 1/1986 | Ogawa | 318/327 |
| 4,572,995 | 2/1986 | Enami | 318/314 |
| 4,605,884 | 8/1986 | Miyagi | 318/314 |
| 4,605,885 | 8/1986 | Mitsuhashi | 318/314 |
| 4,647,828 | 3/1987 | Wachi | 360/73 |

OTHER PUBLICATIONS

Jap. Abs. #60-128879, Masakazu Hoshino, "Control Circuit", 7/9/85.
Jap. Abs. #54-7519, Tadashi Kojima, "Motor Speed Control Circuit", 1/20/79.

Primary Examiner—Willam M. Shoop, Jr.
Assistant Examiner—Brian Young
Attorney, Agent, or Firm—Wenderoth, Lind & Ponack

[57] ABSTRACT

There is disclosed a phase controller comprising: a motor; a rotation detector for converting a motor rotating condition into a speed signal and a phase signal; a speed comparison circuit for detecting a difference between the speed signal and a speed target value; a resettable phase signal generating circuit for generating a phase reference signal; a phase comparison circuit for detecting a phase difference between the phase signal and the phase reference signal and outputting a reset signal to the phase signal generating circuit according to the output of the speed comparison circuit; a synthesizing circuit for synthesizing the output of the speed comparison circuit and the output of the phase comparision circuit; and a motor driving circuit for driving the motor according to the output of the synthesizing circuit. By resetting the phase reference signal according to the motor phase, the phase control pulling-in time is reduced to improve response.

10 Claims, 8 Drawing Sheets

PHASE CONTROLLER FOR MOTOR

FIELD OF THE INVENTION

The present invention relates to a phase controller for a motor.

DESCRIPTION OF THE PRIOR ART

Phase control is usually necessary for the motors for which high precision rotation control is required such as a cylinder motor and a capstan motor, which are used for video tape recorders (hereinafter to be abbreviated as VTR) and digital audio tape recorders (hereinafter to be abbreviated as DAT). Description will be made on an example of conventional motor phase controller hereinbelow.

The rotational speed of a motor is converted into an electric signal by a rotational speed detector and further converted into a voltage signal by a speed detecting circuit. The voltage signal from the speed detecting circuit is transferred through an adder to a direct current amplifier to drive the motor. In other words, a speed control is applied to the motor. On the other hand, the rotational phase of the motor is converted by a rotary phase detector into an electric signal and transferred through an amplifier to a phase detecting circuit. The phase detecting circuit converts a phase difference between the rotational phase signal amplified by the amplifier and a phase reference signal into a voltage signal, which is transferred through a compensation circuit to the adder. By these steps, the motor is subjected to a phase control with the phase reference signal.

According to the constitution as above, however, the time required to pull-in the phase is determined by the response time of the phase control system, so that more rapid phase pulling-in is impossible.

SUMMARY OF THE INVENTION

An object of the present invention is to shorten the phase pull-in time in the phase control of motors as described above.

In order to attain the above object, the present invention has a construction comprising:
a motor to be subjected to control;
a rotation detector for producing a speed signal and a phase signal of the motor;
a speed comparison circuit for producing a speed difference signal between the speed signal from the rotation detector and a target value;
a resettable phase signal generating circuit for producing a reference phase signal;
a phase comparison circuit which produces a phase difference signal between the phase signal from the rotation detector and the reference phase signal from the phase signal generating circuit, and is responsive to the speed difference signal from the speed comparison circuit for outputting a reset signal to the phase signal generating circuit when the rotational speed of the motor is in a prescribed range;
a synthesizing circuit for synthesizing the speed difference signal from the speed comparison circuit and the phase difference signal from the phase comparison circuit; and
a motor driving circuit for driving the motor in response to an output of the synthesizing circuit.

By means of the abovementioned construction it becomes possible to shorten the phase control pull-in time by resetting the reference phase signal in accordance with the phase of the motor.

For example, there are such merits that, when the phase controller of the invention is used to control the cylinder motor of VTR or DAT, it becomes possible to pick up sound quickly after a transition from one mode to another, and when used to control the capstan motor of VTR or DAT, a continuous recording after a STOP or PLAY mode without track dislocation can be realized.

BRIEF DESCRIPTION OF THE DRAWINGS

FIGS. 3a to 3i, 4a to 4i, and 5a to 5f are timing charts for illustrating the operation of the FIG. 2 embodiment;

FIGS. 7a to 7i, and 8a to 8h are timing charts for illustrating the operations of the FIG. 6 embodiment.

DESCRIPTION OF THE PREFERRED EMBODIMENT

Figure 1:
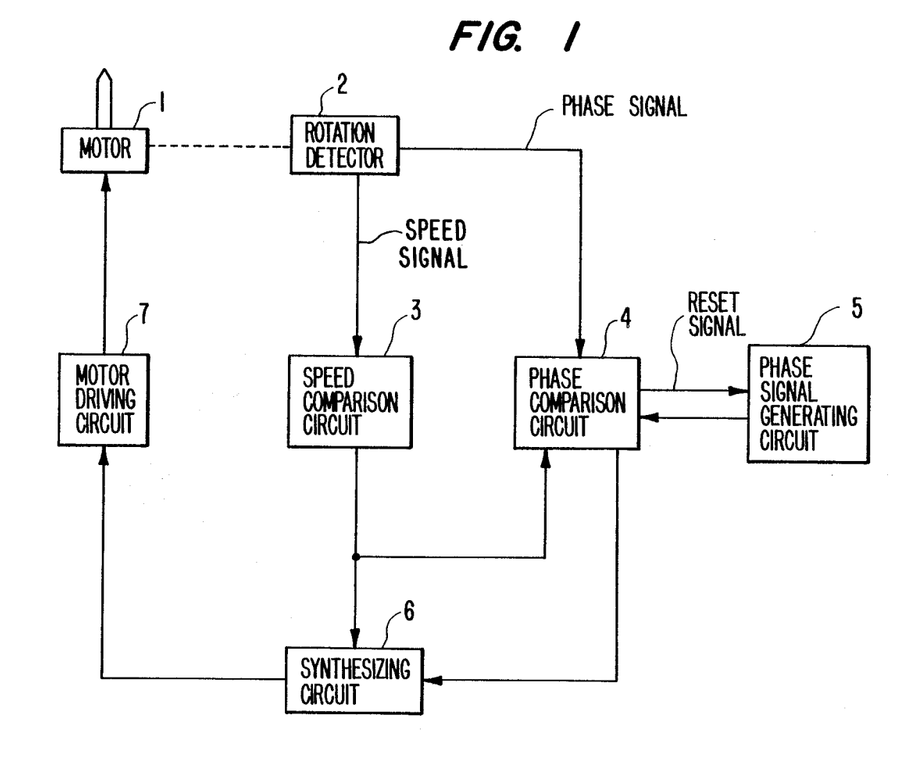
FIG. 1 is a block diagram of one embodiment of the present invention.

FIG. 1 is a block diagram showing one embodiment of a phase controller for a motor according to the present invention.

The rotational speed and the rotational phase of a motor 1 are detected by a rotation detector 2 and outputted as a speed signal and a phase signal, respectively. A speed comparison circuit 3 produces a speed difference signal by comparing the speed signal from the rotation detector 2 with a target value, and outputs it to a synthesizing circuit 6. A phase comparison circuit 4 detects a phase difference between the phase signal from the rotation detector 2 and a phase reference signal generated by a phase signal generating circuit 5, and outputs a phase difference signal to the synthesizing circuit 6. The phase comparison circuit 4 outputs also a reset signal for resetting the phase signal generating circuit 5 in response to the output of the speed comparison circuit 3. The synthesizing circuit 6 synthesizes the speed difference signal and the phase difference signal to produce a drive command signal. A motor driving circuit 7 drives the motor 1 in response to the drive command signal.

Figure 2:
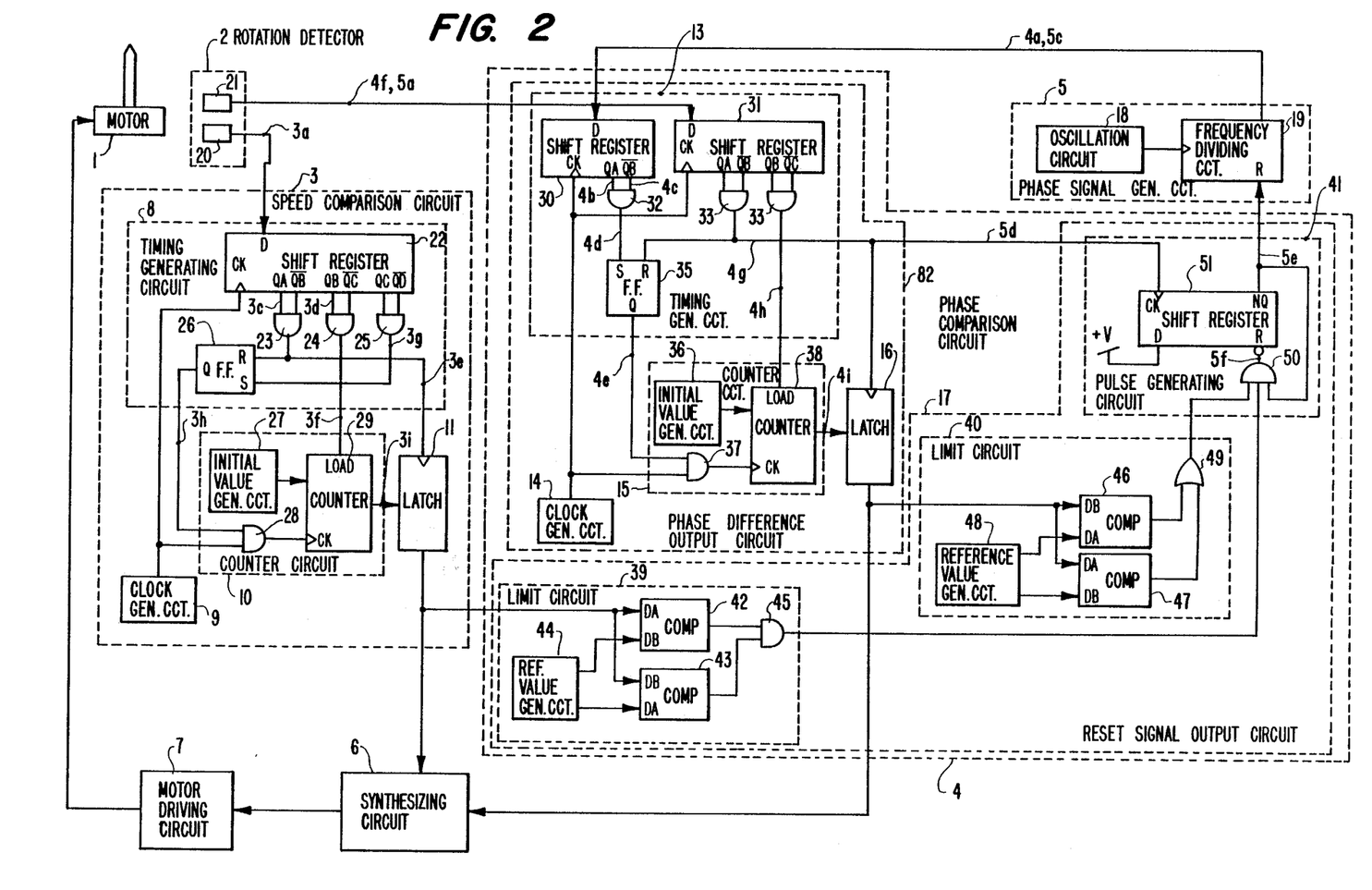
FIG. 2 is a block diagram showing a concrete example of one embodiment of the present invention.

FIG. 2 is one embodiment of detailed circuit construction of FIG. 1.

The rotation detector 2 is constituted by a speed detector 20 for outputting pulses having a period proportional to the rotation cycle of the motor 1, a speed signal, and a phase detector 21 for outputting one pulse per one rotation cycle of the motor 1, a phase signal.

The speed comparison circuit 3 is constituted by a timing generating circuit 8, a clock generating circuit 9, a counter circuit 10, and a latch circuit 11.

The timing generation circuit 8 comprises a shift register circuit 22, AND circuits 23, 24, 25, and an RS flip-flop 26. The counter circuit 10 comprises an initial value generating circuit 27, and AND circuit 28, and a counter circuit 29 with a load terminal.

Figure 3:
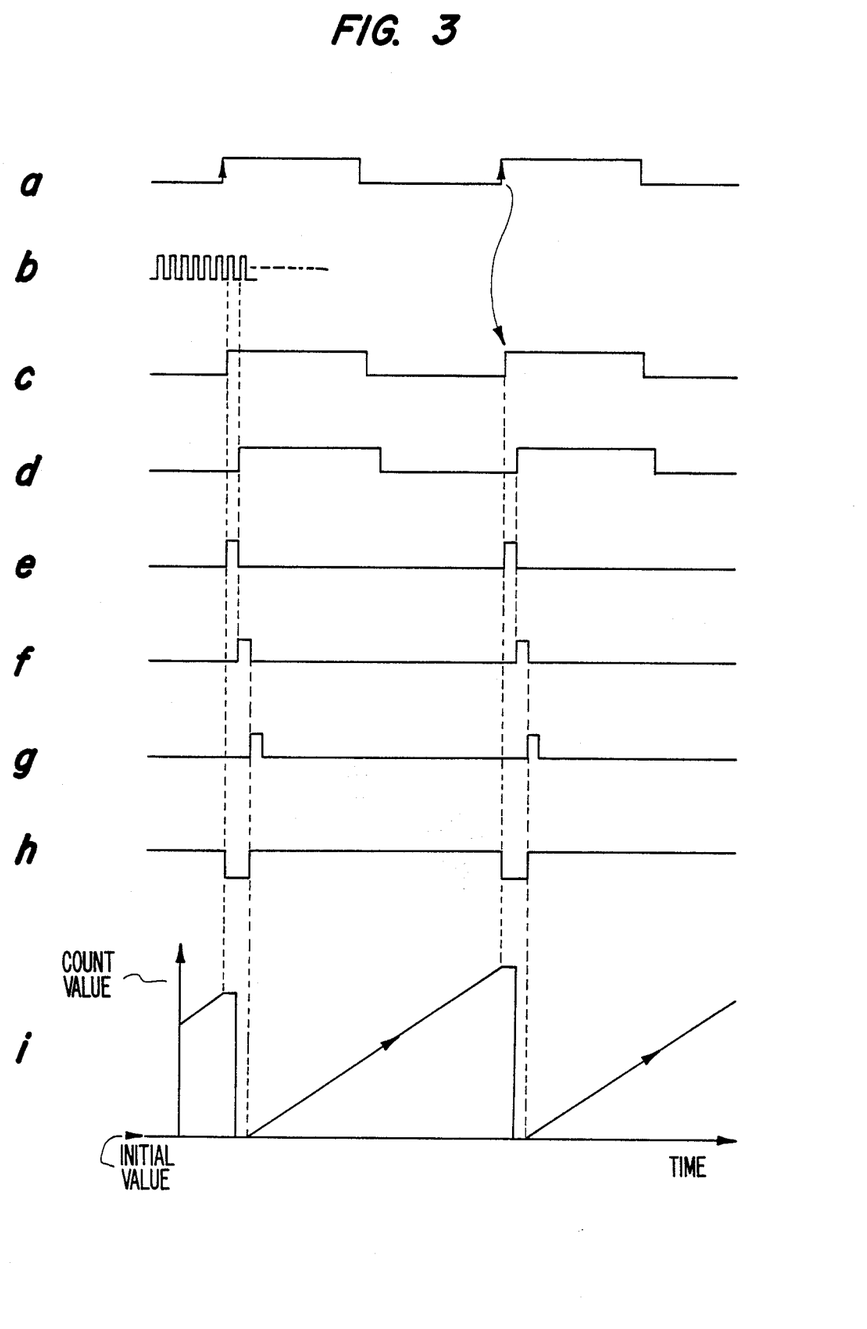

The shift register circuit 22 is operated by output clock (FIG. 3b) of the clock generating circuit 9 to shift the speed signal (FIG. 3a) from the speed detector 20 as shown in FIG. 3c and d. The AND circuits 23, 24 and 25 produce a latch signal (FIG. 3e), a load signal (FIG. 3f) and a startsignal (FIG. 3g), respectively, from outputs of the shift register circuit 22. The RS flip-flop 26 is reset by the latch signal and set by the start signal. Accordingly, the output of the RS flip-flop 26 becomes as shown in FIG. 3h.

When the speed signal becomes "H" (hereinafter, a high level of a signal is shown by "H", and a low level by "L"), the output of the RS flip-flop 26 becomes "L", and the output of the AND circuit 28 receiving the clock from the clock generating circuit 9 also becomes "L", so that the counting operation of the counter circuit 29 is stopped. And, by the latch signal from the AND circuit 23, the count value of the counter circuit 29 is latched in the latch circuit 11. The counter circuit 29 loads an output value of the initial value generating circuit 27 by the load signal from the AND circuit 24. The RS flip-flop 26 is set by the start signal from the AND circuit 25, so that the counter circuit 29 again starts counting the output of the AND circuit 28. This state is shown in FIG. 3i. Accordingly, on each occasion of a pulse of the speed signal, the latch circuit 11 latches a value of the period of the speed signal counted by the output of the clock generating circuit 9.

The phase comparison circuit 4 is constituted by a phase difference output circuit 82 and a reset signal output circuit 17. This phase difference output circuit 82 comprises a timing generating circuit 13, a clock generating circuit 14, a counter circuit 15, and a latch circuit 16. The reset signal output circuit 17 comprises limit circuits 39, 40 and a pulse generating circuit 41. The timing generating circuit 13 is constituted by shift register circuits 30, 31, AND circuits 32, 33, 34, and an RS flip-flop 35.

Figure 4:
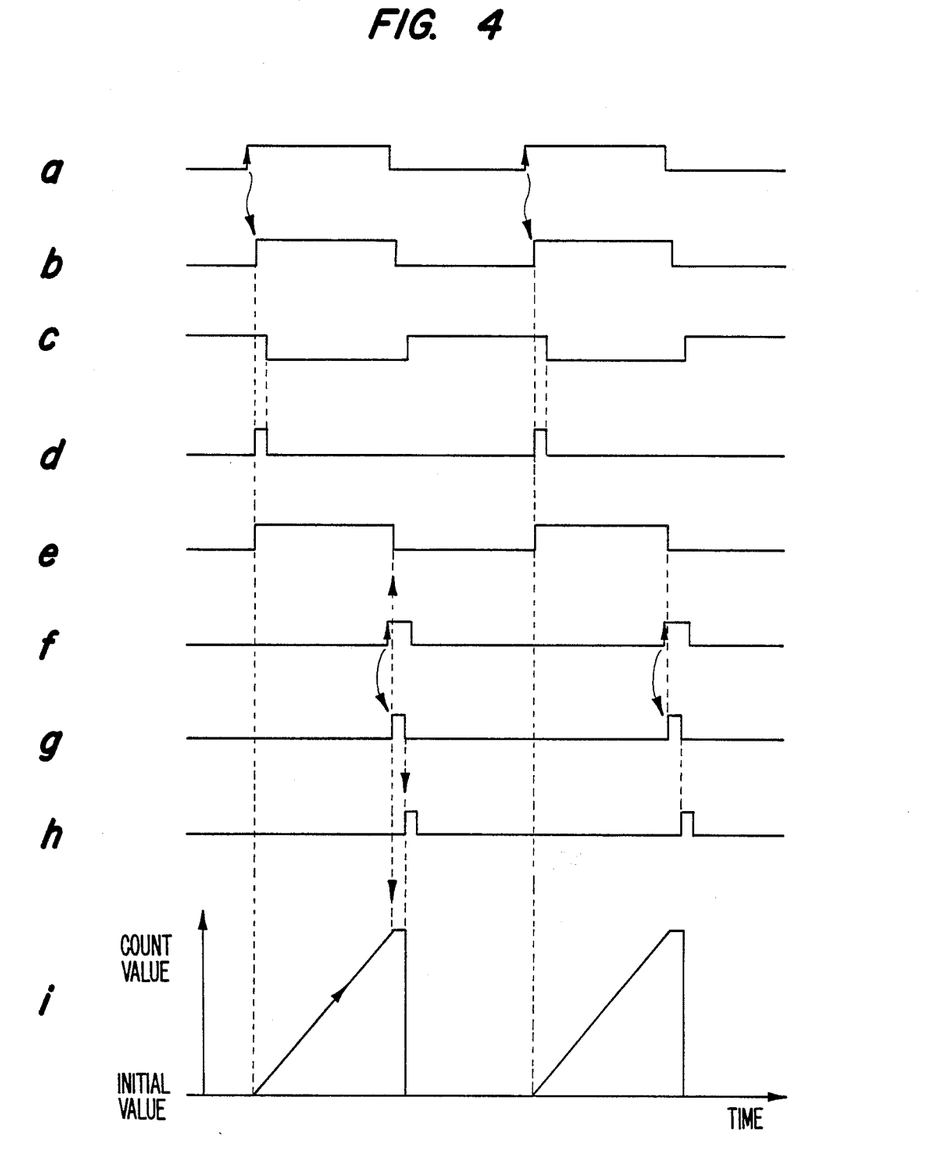

The shift register circuit 30 is operated by output clock of the clock generating circuit 14 to shift the phase reference signal (FIG. 4a) from the phase signal generating circuit 5. Outputs (FIG. 4b, c) from the shift register circuit 30 is inputted into the AND circuit 32 whose output signal (FIG. 4d) sets the RS flip-flop 35. An output of the RS flip-flop 35 is shown in FIG. 4e. The AND circuit 37 passes the output of the clock generating circuit 14 to the counter circuit 38 in response to the output of the flip-flop 35, so that the counter circuit 38 starts counting. The shift register circuit 31 is operated by the output clock of the clock generating circuit 14 to shift the phase signal (FIG. 4f) from the phase detector 21. The AND circuits 33, 34 produce the timing signals shown in FIGS. 4g and h, respectively, from outputs of the shift register circuit 31. The output of the AND circuit 33 resets the RS flip-flop 35 to stop the clock of the counter circuit 38, and at the same time is inputted into the latch circuit 16 so that the latch circuit 16 latches the counting value of the counter circuit 38. And, in response to the output of the AND circuit 34, an initial value from the initial value generating circuit 36 is loaded on the counter circuit 38. Accordingly, the latch circuit 16 latches a phase difference signal corresponding to a phase difference between the phase reference signal and the phase signal and outputs the phase difference signal to the synthesizing circuit 6 and the limit circuit 40.

The limit circuit 39 is composed of comparator circuits 42, 43 each of which compares the values of the signals at its two input terminals DA and DB and outputs an "H" level signal when the signal at DA is larger than that at DB, a reference value generating circuit 44, and an AND circuit 45. The reference value generating circuit 44 outputs a lower limit value to the DB terminal of the comparator circuit 42 and an upper limit value to the DA terminal of the comparator circuit 43. The output of the speed comparison circuit 3 is inputted into the DA terminal of the comparator circuit 42 and the DB terminal of the comparator circuit 43, and compared with the lower limit value and the upper limit value. An output of the AND circuit 45 which receives outputs of the comparator circuits 42 and 43 becomes "H" if the value of the output of the speed comparison circuit 3 is between the lower limit value and the upper limit value.

The limit circuit 40 is constituted by comparator circuits 46, 47 similar to the abovementioned comparator circuits 42, 43, a reference value generating circuit 48, and an OR circuit 49. The reference value generating circuit 48 outputs a lower limit value to the DA terminal of the comparator circuit 46 and an upper limit value to the DB terminal of the comparator circuit 47. The output of the latch circuit 16 is inputted into the DB terminal of the comparator circuit 46 and the DA terminal of the comparator circuit 47, and compared with the lower limit value and the upper limit value. An output of the OR circuit 49 becomes "H" when the value of the output of the latch circuit 16 is smaller than the lower limit value or larger than the upper limit value.

Figure 5:
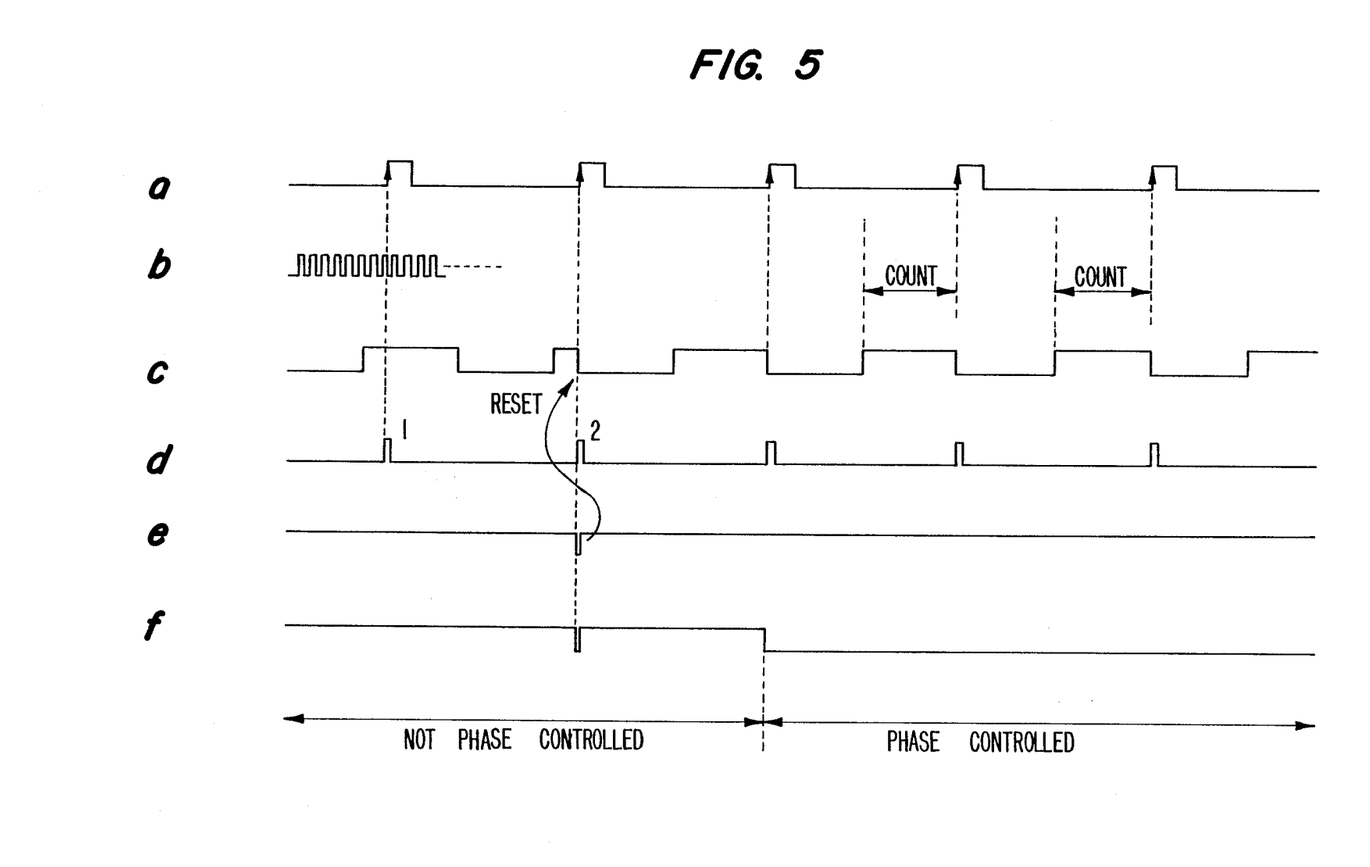

The pulse generating circuit 41 is constituted by a shift register circuit 51 and an AND circuit 50. The shift register circuit 51 normally maintains its output NQ "H" because of its reset input being "L". When the output of the speed comparison circuit 3 is within the range set by the reference value generating circuit 44 and the output of the latch circuit 16 is within the range set by the reference value generating circuit 48, an output of the AND circuit 50 becomes "H" (FIG. 5f), and so that the shift register 51 starts its shift operation responsive to the output (FIG. 5d) of the AND circuit 33. As to the output of the shift register circuit 51, as shown in FIG. 5e, the output NQ becomes "L" at the second shift operation. The output NQ is applied as a reset signal to the phase signal generating circuit 5, and through the AND circuit 50 to the reset terminal of the shift register circuit 51.

The phase signal generating circuit 5 is constituted by an oscillation circuit 18 and a frequency dividing circuit 19 with a reset terminal. An output (FIG. 5b) of the oscillation circuit 18 is divided by the frequency dividing circuit 19 and the divided signal is outputted as a phase reference signal (FIG. 5c). The phase reference signal from the frequency dividing circuit 19 after receiving the reset signal at its reset terminal is so set that the phase relationship, immediately after receipt of the reset signal, between the phase signal of the motor 1 and the phase reference signal becomes a target value of the phase control.

The output of the speed comparison circuit 3 and the output of the phase comparison circuit 4 are synthesized in the synthesizing circuit 6. According to the synthesized output from the synthesizing circuit 6, the motor driving circuit 7 drives the motor 1.

Accordingly, with the above embodiment, when the motor 1 changes from the stopped state or from a state of rotating at a certain speed to the phase controlled state to rotate at a prescribed speed, the pulling-in of the speed control is detected by the limit circuit 39, the state that the phase control is released is detected by the limit circuit 40, and the phase reference signal of the phase signal generating circuit is reset according to the phase signal of the motor 1. Therefore, the phase pulling-in is instantaneously completed.

Although the count number of the shift register circuit 51 is set as 2, this number may be arbitrarily set according to the response of the phase system.

The above embodiment can be effectively applied for example to the control of the cylinder motor of VTR or DAT.

Figure 6:
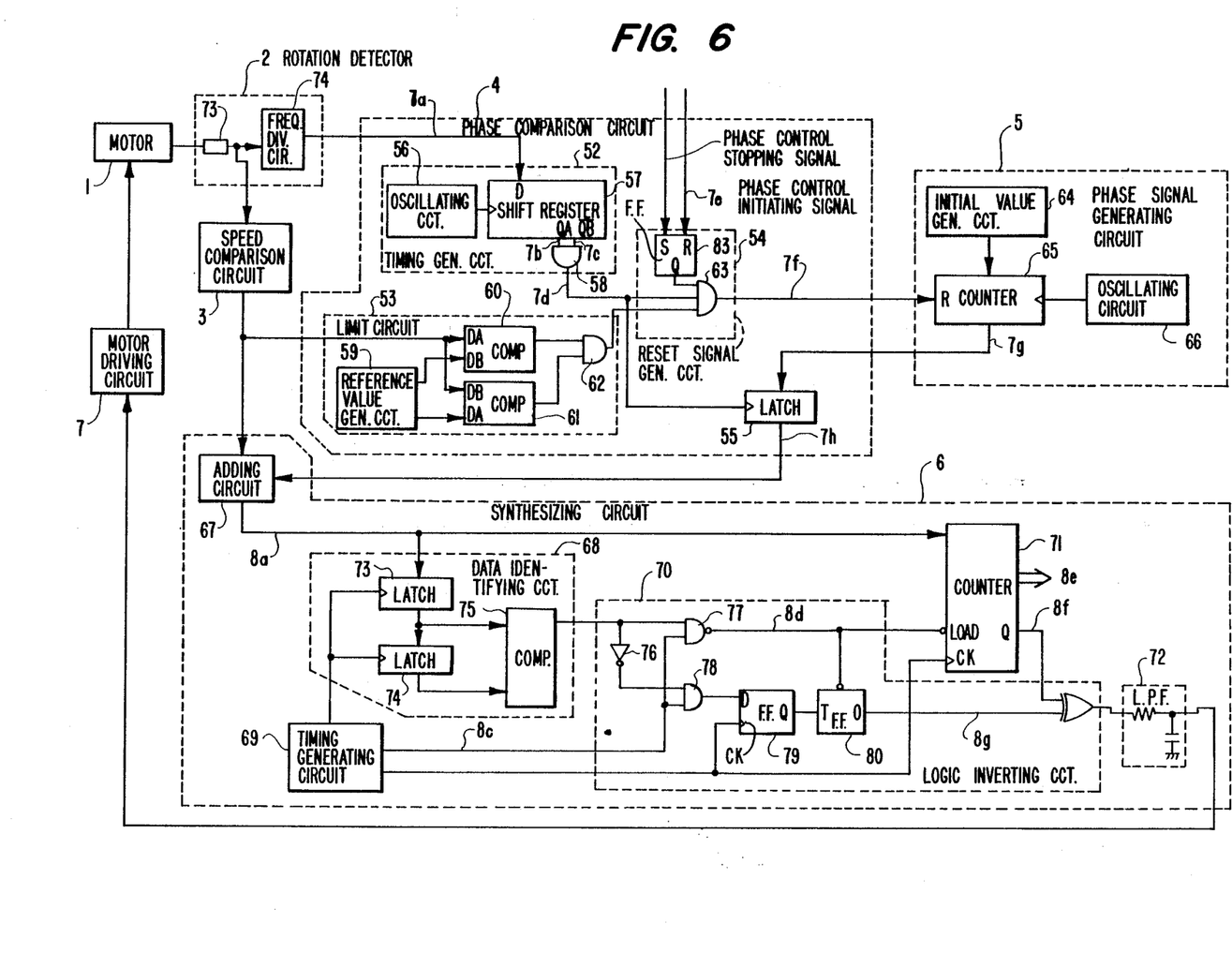
FIG. 6 is a block diagram showing another embodiment of the present invention.

FIG. 6 is the second embodiment of the detailed circuit constitution of FIG. 1, and the description of the parts identical with those of FIG. 2 is omitted.

The rotation detector 2 is constituted by a speed detector 73 which outputs a signal having a period proportional to the rotating cycle of the motor 1 as a speed signal, and a frequency dividing circuit 74 which divides the output of the speed detecor 73 and outputs the divided signal as a phase signal.

The phase comparison circuit 4 comprises a timing generating circuit 52, a limit circuit 53 for detecting whether the output of the speed comparison circuit 3 is within a prescribed range or not, a reset signal generating circuit 54, and a latch circuit 55.

The timing generating circuit 52 is constituted by an oscillating circuit 56, a shift register circuit 57, and an AND circuit 58.

The limit circuit 53 is constituted by comparator circuits 60, 61 each of which compares the values of the signals inputted thereto at its two input terminals DA and DB respectively and outputs "H" (high level signal) when the signal at DA is larger than that at DB, a reference value generating circuit 59, and an AND circuit 62. As its operation is equal to that of the aforementioned limit circuit 39, description is omitted.

The reset signal generating circuit 54 is constituted by an RS flip-flop circuit 83 which outputs "L" in response to a phase control initiating signal and "H" in response to a phase control stopping signal, and an AND circuit 63. In VTR or DAT, during the PLAY mode, a phase control is exerted to the motor by using a signal reproduced from a recording tape, but during the REC (RECORD) mode in which there is no reproduced signal, it is necessary to apply a phase control according to the output of the rotation detector of the motor. This embodiment is designed to effect the latter phase control to perform quick phase pulling-in, for example, in case of a shift from the stopping mode to the REC mode (by pressing a REC switch) or in case of a shift from the PLAY mode to the REC mode (by pressing a continuous recording switch), it is intended to complete promptly the phase pulling-in. The phase control initiating signal and the phase control stopping signal are control signals for the phase control using the output of the rotation detector of the motor. These two phase control signals may be produced by a system controller (not shown) for controlling the whole system of VTR or DAT. Alternatively, the phase control initiating signal may be a switch operation detecting signal of the REC or continuous recording switch (not shown), and the phase control stopping signal may be a switch operation detecting signal of the STOP switch (not shown).

The phase signal generating circuit 5 is constituted by an oscillating circuit 66 which oscillates at a specific frequency, an initial value generating circuit 64, and a counter circuit 65 which loads an output of the initial value generating circuit 64 in response to a reset signal from the reset signal generating circuit 54 and starts counting the output clock of the oscillation circuit 66.

Figure 7:
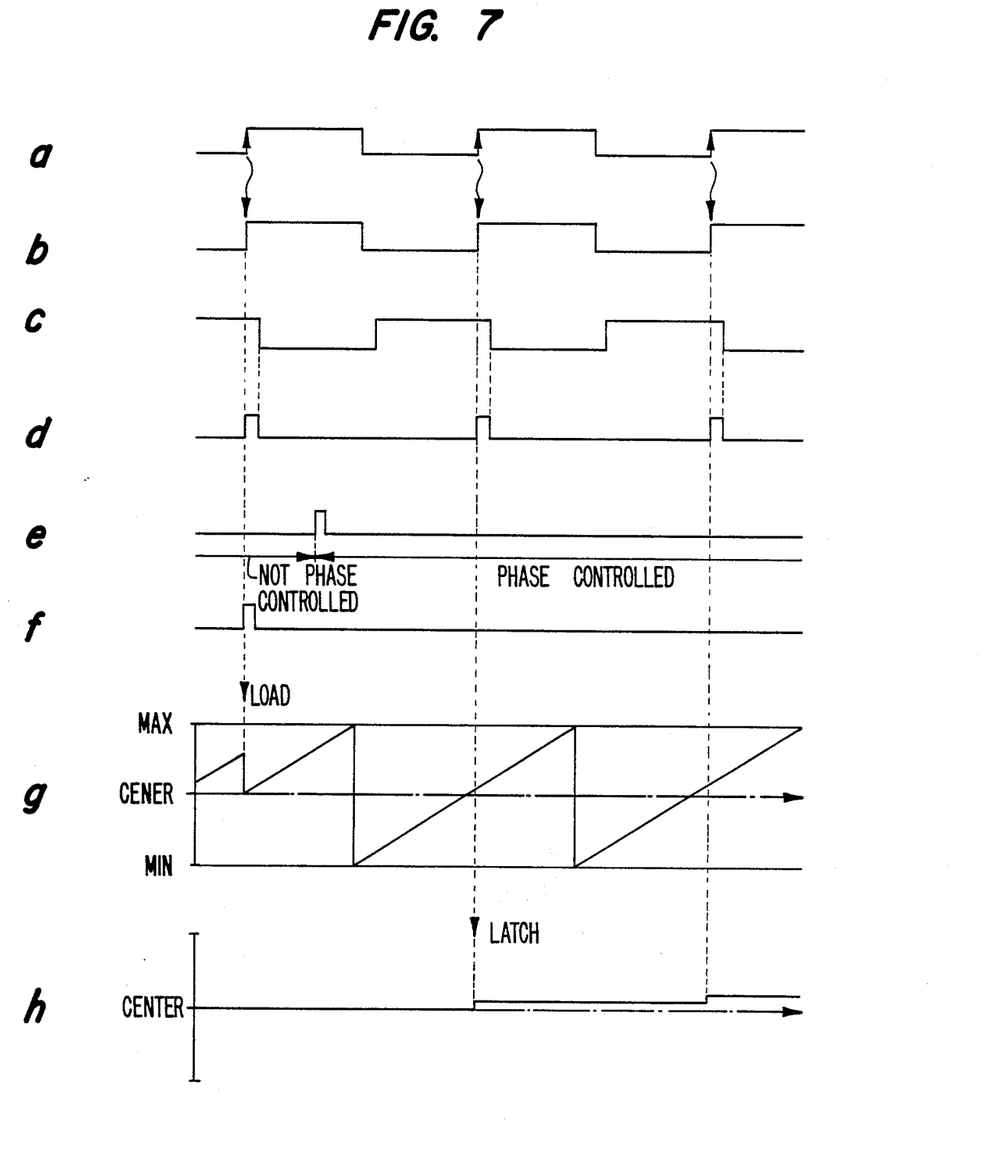

The shift register circuit 57 shifts the phase signal (FIG. 7a) in response to the output clock of the oscillation circuit 56. Output of the shift register circuit 57 is shown in FIGS. 7b, c. The AND circuit 58 outputs a timing signal as shown in FIG. 7d according to the output of the shift register circuit 57.

The limit circuit 53 outputs an "H" level signal when the output value of the speed comparison circuit 3 is between an upper limit value and a lower limit value set by the reference value generating circuit 59.

The shift to the phase control state based on the output of the rotation detector takes place in response to the phase control initiating signal. First, before an input of the phase control initiating signal, i.e., after an input of the phase control stopping signal, the output of the RS flip-flop circuit 83 is "H", and the AND circuit 63 outputs a reset signal as shown in FIG. 7f. The counter circuit 65 carries out counting the output clock of the oscillation circuit 66, in which the time for one circulation of the counter is equal to a reference cycle of the phase system. The count value of the counter circuit 65 when it is reset by the reset signal is set by the initial value generating circuit 64 to be the center value in the operation of the phase control. That is to say, when the phase control is not necessitated, in response to each input of the phase signal (FIG. 7a) the count value of the counter circuit 65 is set to the output value of the initial value generating circuit 64, and latched by the latch circuit 55, so that the output of the phase comparison circuit 4 becomes a constant value. The count value of the counter circuit 65 is shown in FIG. 7g, and the output value of the latch circuit 55 is shown in FIG. 7h.

When the phase control initiating signal (FIG. 7e) is inputted, the output of the RS flip-flop circuit 83 becomes "L", so that the reset signal which is the output of the AND circuit 63 becomes "L" and thereafter is kept "L" as shown in FIG. 7f. Accordingly, the counter circuit 65 does not load the output value of the initial value generating circuit 64 and continues counting the output clock of the oscillation circuit 66. The latch circuit 55 latches the count value of the counter circuit 65 in response to the output of the AND circuit 58 (FIG. 7d) and outputs the latched value to the synthesizing circuit 6. This output value represents a phase difference from the one circulation cycle of the counter circuit 65. The condition of the counter circuit 65 is shown in FIG. 7g, and the output value of the latch circuit in FIG. 7h.

Accordingly, in shifting to the phase control condition in response to the phase control initiating signal, pull-in to the center value of the counter circuit 65 is completed instantaneously.

The output of the speed comparison circuit 3 and the output of the latch circuit 55 are added, subjected to pulse width modulation, and then passed through a low-pass filter circuit, in the synthesizing circuit 6. The construction and operation of this sequence are illustrated in detail hereinafter.

The synthesizing circuit 6 is constituted by an adding circuit 67, a data identifying circuit 68, a timing generating circuit 69, a logical inverting circuit 70 for inverting pulse-width-modulated data, a synchronous counter circuit 71, and a low-pass filter circuit 72.

The data identifying circuit 68 is constituted by latch circuits 73, 74 responsive to an output signal of the timing generating circuit 69, and a comparison circuit 75 which compares latched values of the latch circuits 73, 74 and outputs "L" when the values are different from each other.

Figure 8:
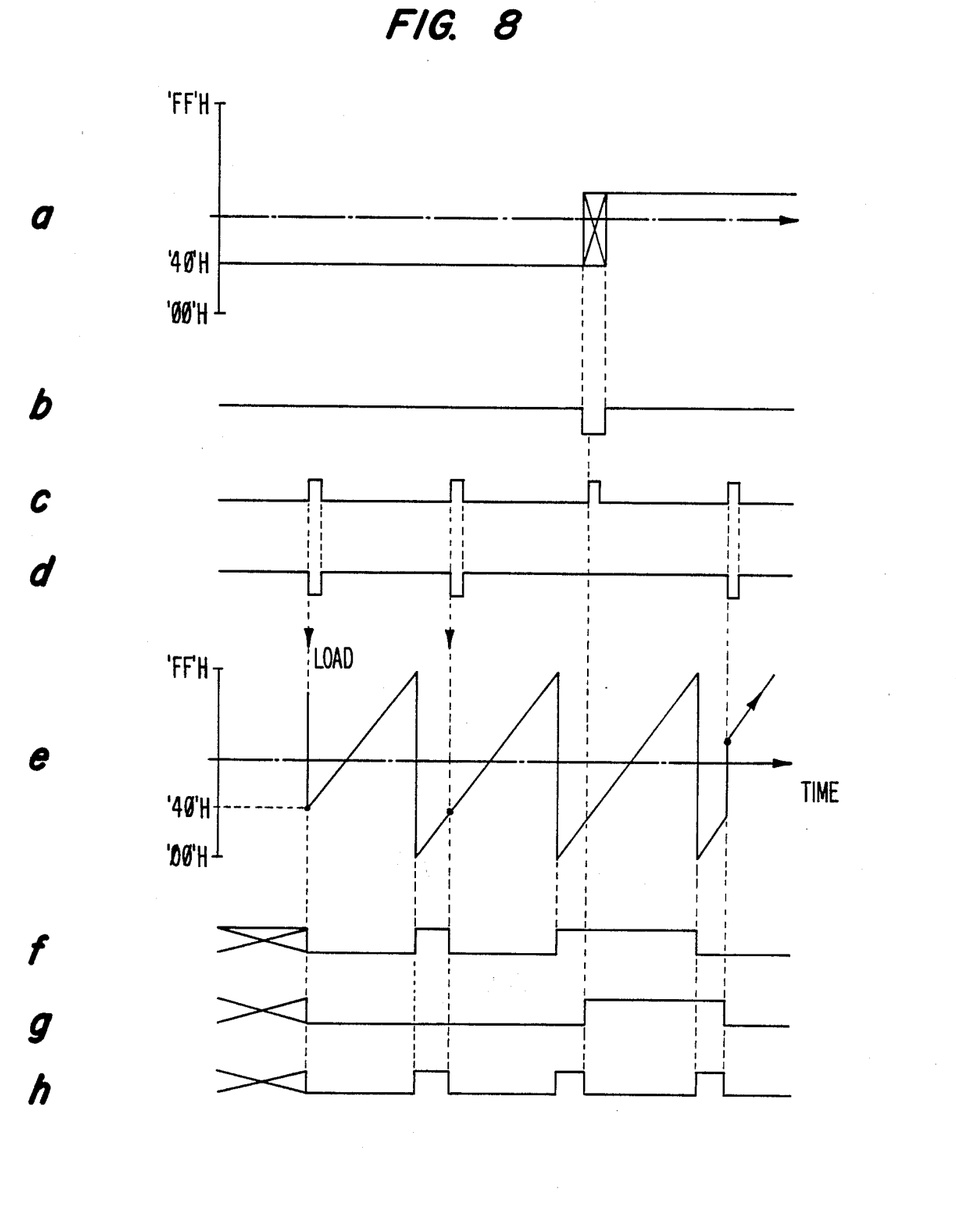

The output of the speed comparison circuit 3 and the output of the latch circuit 55 are added in the adding circuit 67, and the added value is inputted to the synchronous counter circuit 71 and the data identifying circuit 68. The output value of the adding circuit 67 is shown in FIG. 8a. In this embodiment, the data is assumed an 8 bit length data between '00'H (hexadecimal) and 'FF'H. The data identifying circuit 68 outputs "L" when the output data of the adding circuit 67 is changed and "H" when the same is constant (FIG. 8b). The timing generation circuit 69 outputs a clock signal and a load signal as shown in FIG. 8c. In the embodiment of FIG. 6, due to the 8 bit length of data, the load signal is $2^8$ divisional frequency of the clock. The synchronous counter circuit 71 has at least $8+1=9$ bit length. The synchronous counter circuit 71 loads the output values of the adding circuit 67 in response to a load signal from a NAND circuit 77 as shown in FIG. 8d only when the output of the data identifying circuit 68 is "H", and counts, as shown in FIG. 8e, the clock output from the timing generating circuit 69. In this example the loaded 8 bit data is '40'H (hexadecimal) as shown in FIG. 8e. As an effective output of the synchronous center circuit 71 the bit-9 data of its count data is selected. This is shown in FIG. 8f. This output (FIG. 8f) is a pulse-width-modulated data of the data inputted to the synchronous counter circuit 71, and is applied to an EX-OR circuit 81.

When the output of the data identifying circuit 68 is "L", the load signal is not inputted to the synchronous counter circuit 71, so that the synchronous counter circuit 71 continues its counting operation. On the other hand, since the output of the data identifying circuit 68 is applied through an inverter 76 to an AND circuit 78, the output of the AND circuit 78 becomes "H", which is latched by a D flip-flop 79, so that an output logic of a T flip-flop 80 is inverted. This state is shown in FIG. 8g. As a result, as shown in FIG. 8h, the output of the EX-OR circuit 81 is inverted and the previous pulse width is retained. Therefore, the pulse-width-modulated output signal is not disturbed at the time of variation of the data.

The pulse-width-modulated output signal from the EX-OR circuit 81 is converted to an analog signal by the low-pass filter circuit 72 and outputted to the driving circuit 7 to drive the motor 1.

In the above-described embodiment, the bit number of the data inputted to the synchronous counter circuit 71 was set to be 8 bits. However, the bit number is to be determined by the data length of the output of the speed comparison circuit 3 and the phase comparison circuit 4, and it is not limitative.

The embodiment shown in FIG. 6 can be effectively employed for controlling the capstan motor of VTR or DAT.

What is claimed is:

1. A phase controller for applying phase control to a motor, comprising:
   a rotation detector for producing a speed signal and a phase signal which represent rotating condition of the motor;
   a speed comparison circuit for producing a speed difference signal between the speed signal from the rotation detector and a speed target value;
   a resettable phase signal generating circuit for generating a phase reference signal;
   a phase comparison circuit which outputs a phase difference signal between the phase signal from the rotation detector and the phase reference signal from the phase signal generating circuit, and outputs a reset signal to the phase signal generating circuit according to the speed difference signal from the speed comparison circuit so as to cause said phase reference signal to be in phase with said phase signal;
   a synthesizing circuit for synthesizing the speed difference signal from the speed comparison circuit and the phase difference signal from the phase comparison circuit; and
   a motor driving circuit for driving the motor according to an output of the synthesizing circuit.

2. A phase controller for applying phase control to a motor, comprising:
   a rotation detector for producing a speed signal and a phase signal which represent rotating condition of the motor;
   a speed comparison circuit for producing a speed difference signal between the speed signal from the rotation detector and a speed target value;
   a resettable phase signal generating circuit for generating a phase reference signal;
   a phase difference output circuit which outputs a phase difference signal between the phase signal from the rotation detector and phase reference signal from the phase signal generating circuit;
   a reset signal output circuit which outputs a reset signal to the phase signal generating circuit according to the speed difference signal from the speed comparison circuit so as to cause said phase reference signal to be in phase with said phase signal;
   a synthesizing circuit for synthesizing the speed difference signal from the speed comparison circuit and the phase difference signal from the phase difference output circuit; and
   a motor driving circuit for driving the motor according to an output of the synthesizing circuit.

3. The phase controller as defined in claim 2, wherein said speed comparison circuit comprises:
   a first timing generation circuit for generating a timing signal from the speed signal;
   a first clock generating circuit which generates a clock with a constant cycle;
   a first counter circuit which starts counting the clock from the first clock generating circuit in response to the timing signal from the first timing generation circuit; and
   a first latch circuit which latches a count value of the first counter circuit in response to the timing signal from the first timing generation circuit, and
said phase difference output circuit comprises:
   a second timing generation circuit for generating a timing signal from the phase signal and the phase reference signal;
   a second clock generating circuit which generates a clock with a constant cycle;
   a second counter circuit which starts counting the clock from the second clock generating circuit in response to the timing signal from the second timing generation circuit; and
   a second latch circuit which latches a count value of the second counter circuit in response to the timing signal from the second timing generation circuit.

4. The phase controller as defined in claim 2, wherein said phase signal generating circuit comprises:

an oscillation circuit which oscillates at a prescribed frequency; and a resettable frequency dividing circuit which divides an output of the oscillation circuit to obtain the phase reference signal and is reset by the reset signal.

5. The phase controller as defined in claim 2, wherein said reset signal output circuit comprises: a limit circuit for detecting whether the second difference signal from the speed comparison circuit is within a prescribed range or not; and a pulse generating circuit responsive to a detection result by the limit circuit that the speed difference signal from the speed comparison circuit is within the prescribed range for outputting the reset signal to the phase signal generating circuit, thereby setting the phase reference signal to the phase signal of the motor to complete phase pulling-in instantaneously.

6. The phase controller as defined in claim 2, wherein said reset signal output circuit comprises: a first limit circuit for detecting whether the speed difference signal from the speed comparison circuit is within a first prescribed range or not; a second limit circuit for detecting whether the phase difference signal from the phase difference output circuit is within a second prescribed range or not; and a pulse generating circuit responsive to detection results by the first limit circuit that the speed difference signal is within the first prescribed range and by the second limit circuit that the phase difference signal is outside the second prescribed range for outputting the reset signal to the phase signal generating circuit to reset the phase reference signal.

7. A phase controller for applying phase control to a motor, comprising:

a rotation detector for outputting a pulse signal whose cycle is proportional to a rotation cycle of the motor;

a speed comparison circuit for outputting a difference signal between the cycle of the pulse signal from the rotation detector and a target value;

an oscillation circuit for oscillating at a specified frequency;

an initial value generating circuit for generating an initial value;

a counter circuit which is reset for loading the initial value from the initial value generating circuit and for thereafter counting an output of the oscillation circuit;

a phase comparison circuit for outputting a reset signal to the counter circuit according to the difference signal from the speed comparison circuit and the pulse signal from the rotation detector, said phase comparison circuit including a latch circuit for latching a count value of the counter circuit;

a synthesizing circuit for synthesizing the difference signal from the speed comparison circuit and an output of the latch circuit; and a motor driving circuit for driving the motor according to an output of the synthesizing circuit.

8. The phase controller as defined in claim 7, wherein said speed comparison circuit comprises:

a timing generation circuit for generating a timing signal from the pulse signal from the rotation detector;

a clock generation circuit for generating a clock with a constant cycle;

a counter circuit for counting the clock from the clock generation circuit in response to the timing signal from the timing generation circuit; and a latch circuit for latching a count value of the counter circuit in response to the timing signal from the timing generation circuit.

9. The phase controller as defined in claim 7, wherein said phase comparison circuit comprises:

a limit circuit for detecting whether the difference signal from the speed comparison circuit is within a prescribed range;

a timing generation circuit for generating a timing signal from the pulse signal from the rotation detector; and a reset signal generating circuit for generating the reset signal according to the timing signal from the timing generation circuit and a detection result by the limit circuit and outputting the reset signal to the counter circuit only when phase control is not effected.

10. A phase controller for applying phase control to a motor, comprising:

a rotation detector for producing a speed signal and a phase signal which represent rotating condition of the motor;

a speed comparison circuit for producing a speed difference signal between the speed signal and a speed target value;

a resettable phase signal generating circuit for generating a phase reference signal;

a phase comparison circuit which produces a phase difference signal between the phase signal and the phase reference signal, and outputs a reset signal to the phase signal generating circuit according to the speed difference signal from the speed comparison circuit so as to cause said phase reference signal to be in phase with said phase signal;

an addition circuit for adding the speed difference signal from the speed comparison circuit and the phase difference signal from the phase comparison circuit;

a timing generation circuit for generating a timing signal;

a data identifying circuit for detecting a variation of an output value of the addition circuit in response to the timing signal from the timing generation circuit;

a logic inverting circuit responsive to the timing signal from the timing generation circuit and an output of the data identifying circuit for producing a load signal and for inverting an input signal inputted thereto;

a synchronous counter circuit which counts the timing signal from the timing generation circuit and loads the output value of the addition circuit in response to the load signal from the logic inverting circuit, an output signal of the synchronous counter circuit being inputted as the input signal to the logic inverting circuit;

a low-pass filter circuit for smoothing an output signal of the logic inverting circuit; and a motor driving circuit for driving the motor according to the output signal of the logic inverting circuit.

* * * * *